(12) United States Patent
Goldberg et al.

(10) Patent No.: US 6,741,842 B2
(45) Date of Patent: May 25, 2004

(54) SYSTEM AND METHOD FOR FREQUENCY MANAGEMENT IN A COMMUNICATION DEVICE HAVING A POSITIONING DEVICE

(75) Inventors: Mark A. Goldberg, Davie, FL (US); Jose Korneluk, Boynton Beach, FL (US); Atif Meraj, Plantation, FL (US); Anil Patel, Boca Raton, FL (US); Kristi Annette Haverkamp, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/259,651

(22) Filed: Sep. 30, 2002

(65) Prior Publication Data

US 2004/0063411 A1 Apr. 1, 2004

(51) Int. Cl.[7] .................................................. H04B 1/18
(52) U.S. Cl. .............................. 455/192.2; 455/456.6; 455/556.1
(58) Field of Search .................... 455/192.2, 414.1, 455/427, 414.2, 12.1, 456.1, 456.3, 456.5, 456.6, 457, 75, 76, 84, 255, 258, 318, 556.1

(56) References Cited

U.S. PATENT DOCUMENTS 4,122,408 A * 10/1978 Walls .............................. 331/3
5,418,538 A * 5/1995 Lau ........................ 342/357.15
5,563,608 A * 10/1996 Tachita et al. ......... 342/357.14
6,580,393 B2 * 6/2003 Holt ............................ 342/453

* cited by examiner

*Primary Examiner*—Edward F. Urban
*Assistant Examiner*—Thuan T. Nguyen
(74) *Attorney, Agent, or Firm*—Scott M. Garrett

(57) ABSTRACT

A frequency management scheme for a hybrid cellular/GPS or other device generates a local clock signal for the communications portion of the device, using a crystal oscillator or other part. The oscillator output may be corrected by way of an automatic frequency control (AFC) circuit or software, to drive the frequency of that clock signal to a higher accuracy. Besides being delivered to the cellular or other communications portion of the hybrid device, the compensated clock signal may also be delivered to a comparator to measure the offset between the cellular oscillator and the GPS oscillator. The error in the cellular oscillator may be measured from the AFC operation in the cellular portion of the device. An undershoot or overshoot in the delta between the two oscillators may thus be deduced to be due to bias in the GPS oscillator, whose value may then be determined. That value may then be used to adjust Doppler search, bandwidth or other GPS receiver characteristics to achieve better time to first fix or other performance characteristics.

60 Claims, 6 Drawing Sheets

Figure 2: Frequency Comparator

Figure 3: Frequency Correction Unit

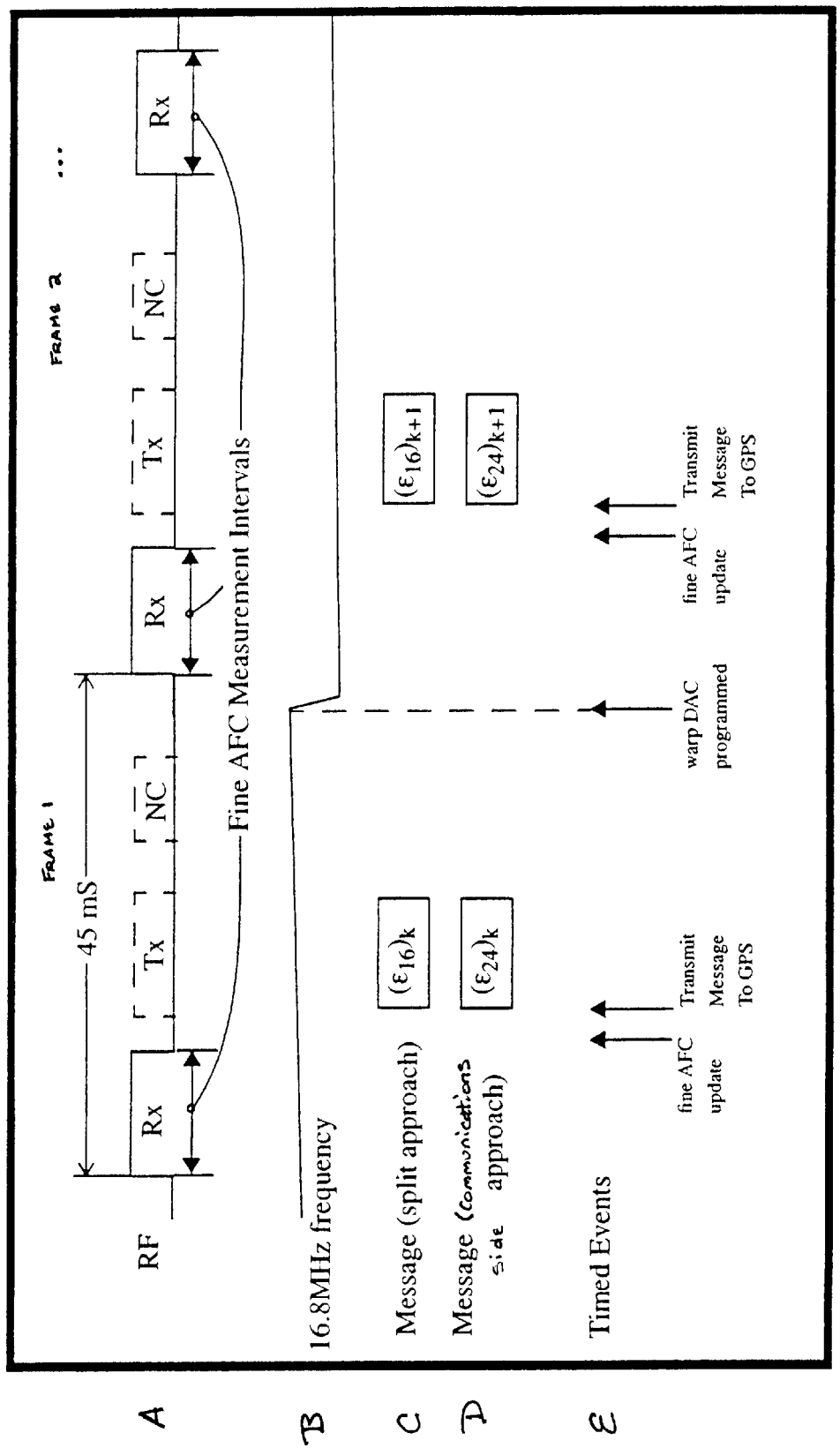
Figure 6: Frequency Aiding Message Timing

SYSTEM AND METHOD FOR FREQUENCY MANAGEMENT IN A COMMUNICATION DEVICE HAVING A POSITIONING DEVICE

FIELD OF THE INVENTION

The invention relates to the field of communications, and more particularly to techniques for generating and managing precision frequency sources in cellular telephones or other communications devices having a location capability, such as Global Positioning System (GPS) or other location service.

BACKGROUND OF THE INVENTION

Two important performance metrics for any GPS or other location-reporting services include the time needed to acquire synchronization with a signal source, and the ability to detect weak signals in noise. For GPS receivers these metrics correspond to time to first fix (TTFF) and receiver sensitivity, respectively. In a practical GPS receiver these metrics are dependent on the availability of an accurate frequency reference to drive the GPS receiver. Accuracies on the order of 0.5 ppm or better are required to attain acceptable GPS performance, for example TTFF ranges of a few tens of seconds. Conventional implementations require expensive precision components such as a temperature compensated crystal oscillator (TXCO) or oven controlled crystal oscillator (OCXO) in order to achieve this level of accuracy.

As a result of the FCC-mandated E911 location service, GPS receivers are being integrated into cellular phones. Cellular networks use highly accurate clocks to maintain network synchronization. Cellular handsets typically contain their own stable reference clock which is locked to the cellular network by automatic frequency control (AFC) or other circuits. However the resulting frequency reference for cellular communications is generally different than that needed for GPS downconversion or other GPS operations. Other problems exist.

SUMMARY OF THE INVENTION

The invention overcoming these and other problems in the art relates in one regard to a system and method for frequency management in a communications device having a positioning feature, such as a cellular phone equipped with GPS location capability, which can dynamically detect the error in a GPS receiver's reference oscillator without directly correcting that oscillator, but instead adjusting Doppler search or other control logic on the GPS side. This type of frequency aiding may be applied continuously or periodically to maintain very accurate frequency information, allowing a narrower bandwidth correlation to be used thereby improving the signal to noise ratio (SNR), and hence, sensitivity of the GPS receiver in a hybrid communications/location device. The frequency assist information may both narrow the carrier offset search space required during satellite acquisition thereby reducing the TTFF of a GPS receiver, as well as shorten the duration which the RF receiver must be powered on thereby reducing the power consumption of a GPS receiver, extending its battery life. Since existing cellular circuitry is made use of to enhance GPS operation, less expensive components may be used, enabling a cost reduction in an integral cellular handset/GPS receiver.

BRIEF DESCRIPTION OF THE DRAWINGS

FIG. 6 illustrates a timing diagram of messaging and other activity, according to embodiments of the invention.

DETAILED DESCRIPTION OF EMBODIMENTS

Figure 1:
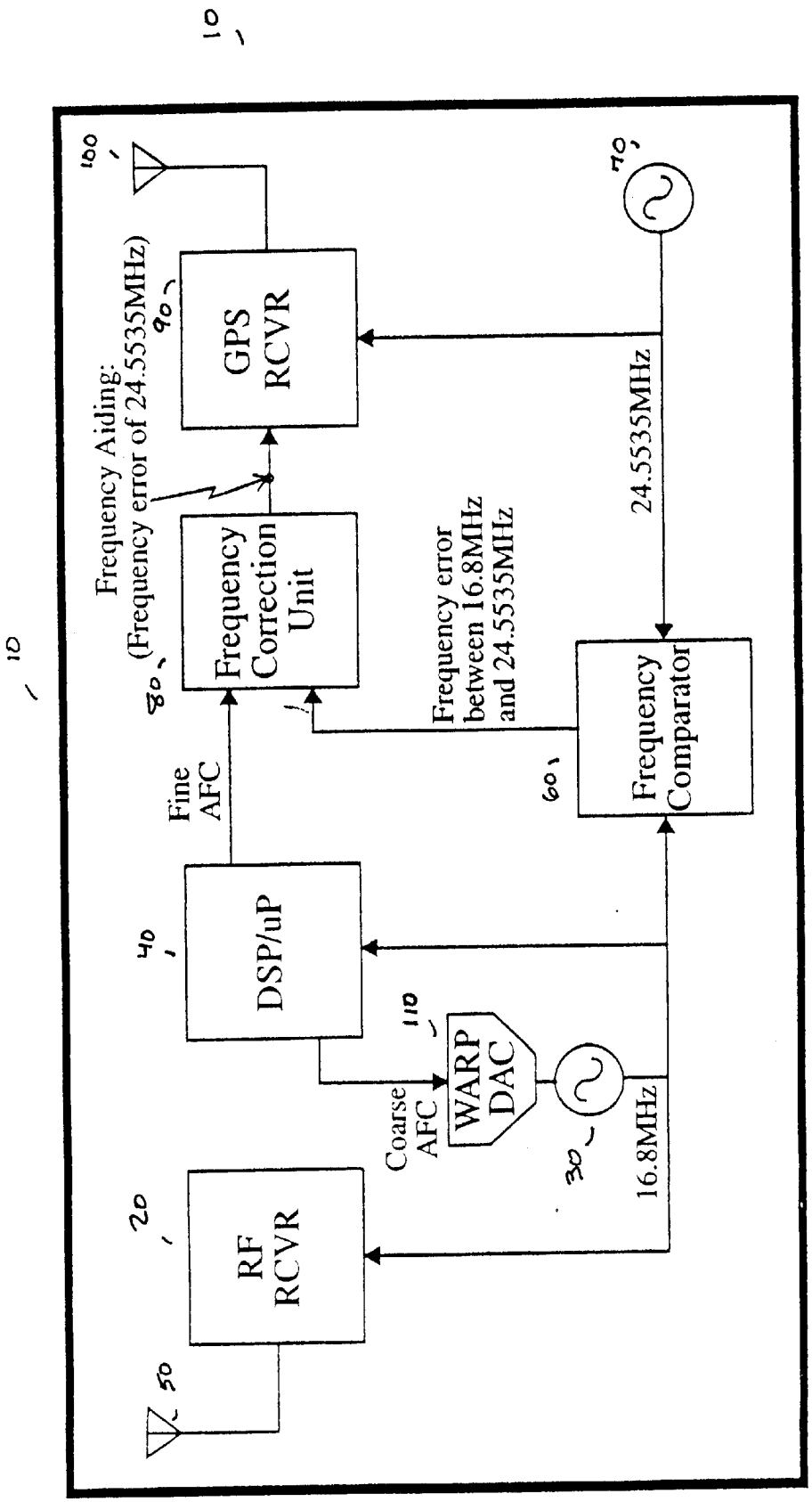
FIG. 1 illustrates an architecture for frequency management in a hybrid communications/positioning device, according to an embodiment of the invention.

FIG. 1 illustrates a hybrid communications/positioning device 10, in which the communications portion of the hybrid device contains a cellular oscillator 30, illustrated as a compensated 16.8 MHz oscillator, which is the reference for cellular circuitry including a radio frequency receiver 20, frequency generation, timing or other components to transmit and receive cellular or other communications via communications antenna 50. A positioning receiver such as a GPS receiver 90 or other location-calculating device may be driven by GPS oscillator 70, illustrated as a free-running 24.5535 MHz oscillator, to drive the acquisition and tracking of satellite or other signals received via GPS antenna 100. In embodiments, the communications/positioning device 10 may use or interface to other positioning systems such as the Russian GLONASS or other terrestrial or satellite-based services.

As illustrated, automatic frequency control (AFC) including a frequency warping digital to analog converter (DAC warp) 110 may be implemented around the cellular oscillator 30 to maintain synchronization with the cellular network with which the hybrid communications/positioning device 10 is registered. This AFC arrangement may in embodiments employ comparatively coarse adjustment steps of 0.1 to 0.2 ppm to warp the frequency (16.8 MHz base) of the cellular oscillator 20 when a drift by that amount is sensed, by voltage or other feedback generated by the DAC warp 110. Other coarse adjustment steps may be used. This AFC action maintains a frequency lock between the native frequency reference broadcast by the cellular network and the cellular oscillator 30 located in the handset or other hybrid communications/positioning device 10 to within the step value of the DAC warp 110 AFC mechanism, which is typically sufficient to ensure reliable cellular or other communications.

The corrective effect of the DAC warp 110 on the cellular oscillator 30 may therefore however be limited to the quantization step of the DAC warp circuitry, which as noted in embodiments may be 0.1 or 0.2 ppm or more or less. However, further improved frequency accuracy may be attained by a second, software-based fine AFC process executing on processor 40, which in embodiments may be or include a digital signal processor such as the DSP 56000 family manufactured by Motorola Corp. or others. The processor 40 may sense and output estimates of the residual error of the cellular oscillator 30 which are finer than the quantization step of the DAC warp 110 to a frequency correction unit 80. Frequency correction unit 80 may in turn communicate the fine AFC data to the GPS receiver 90. In embodiments, the fine AFC data so generated may reflect a 0.05 ppm or greater or lesser accuracy.

Once ascertained, both the DAC warp 110 correction (also referred to as coarse AFC) and/or the fine AFC data may be communicated as frequency aiding intelligence information from the cellular portion of the hybrid communications/GPS location device 10 to the GPS receiver 90. This aspect of operation includes at least a first process to measure the absolute offset between the cellular and GPS clock sources to determine a differential error between the two clock rates from their ideal frequency separation, and a second process to remove the error due to the cellular oscillator 30. This processing leaves only the residual error in the GPS oscillator 70, which may then be accounted for by adapting Doppler search or other control logic in GPS receiver 90.

Figure 2:
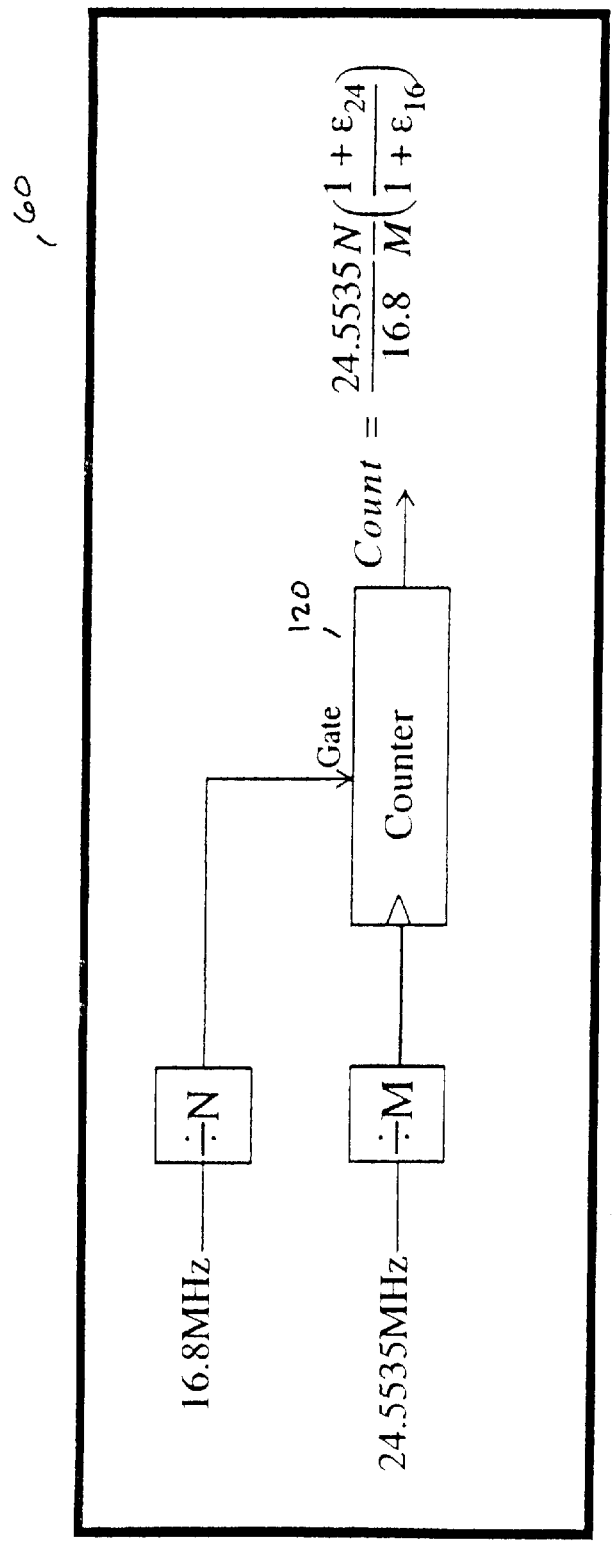
FIG. 2 illustrates an implementation of a frequency comparator, for use according to an embodiment of the invention.

In the first aspect of error analysis, clock signals from the cellular oscillator 30 and the GPS oscillator 70 may be communicated to a frequency comparator 60 that compares the frequency of the two clocks to produce an output which is a measure of the frequency difference between them. There are different ways known in the art to implement such a comparator. One implementation of frequency comparator 60 is illustrated in FIG. 2. This implementation uses a counter 120 illustratively clocked by the 24.5535 MHz or other clock signal of the GPS oscillator 70 or integer divide thereof, and gated by an integer divide of the 16.8 MHz or other clock signal of the compensated cellular oscillator 30. At the end of the gate interval the counter value registered by the counter 120 is proportional to the error between the two clocks. That measure is given by:

$$\text{Count} = \frac{24.5535}{16.8} \frac{N}{M} \left( \frac{1+\varepsilon_{24}}{1+\varepsilon_{16}} \right) \qquad \text{Equation 1}$$

where $\varepsilon_{24}$ is the error of the 24.5535 MHz clock signal, $\varepsilon_{16}$ is the error of the 16.8 MHz clock in ppm/$10^6$, and M and N are integers dividing the GPS oscillator 70 and cellular oscillator 30, respectively. The gate time, averaging method, and number of measurements to be averaged can be adjusted per accuracy, latency or other implementation requirements.

In the second processing aspect of the error analysis, the output of the frequency comparator 60 may be applied along with the fine AFC information to the frequency correction unit 80. Frequency correction unit 80 may correct the error from the frequency comparator 60 by the measured error of the cellular oscillator 30 (at 16.8 MHz) as determined by the fine AFC. The fine AFC represents the error between the 16.8 MHz reference and the timing of the cellular or other communications network. The result of removing that remaining error due to the cellular oscillator 30 is the absolute error of the GPS oscillator 70.

Figure 3:
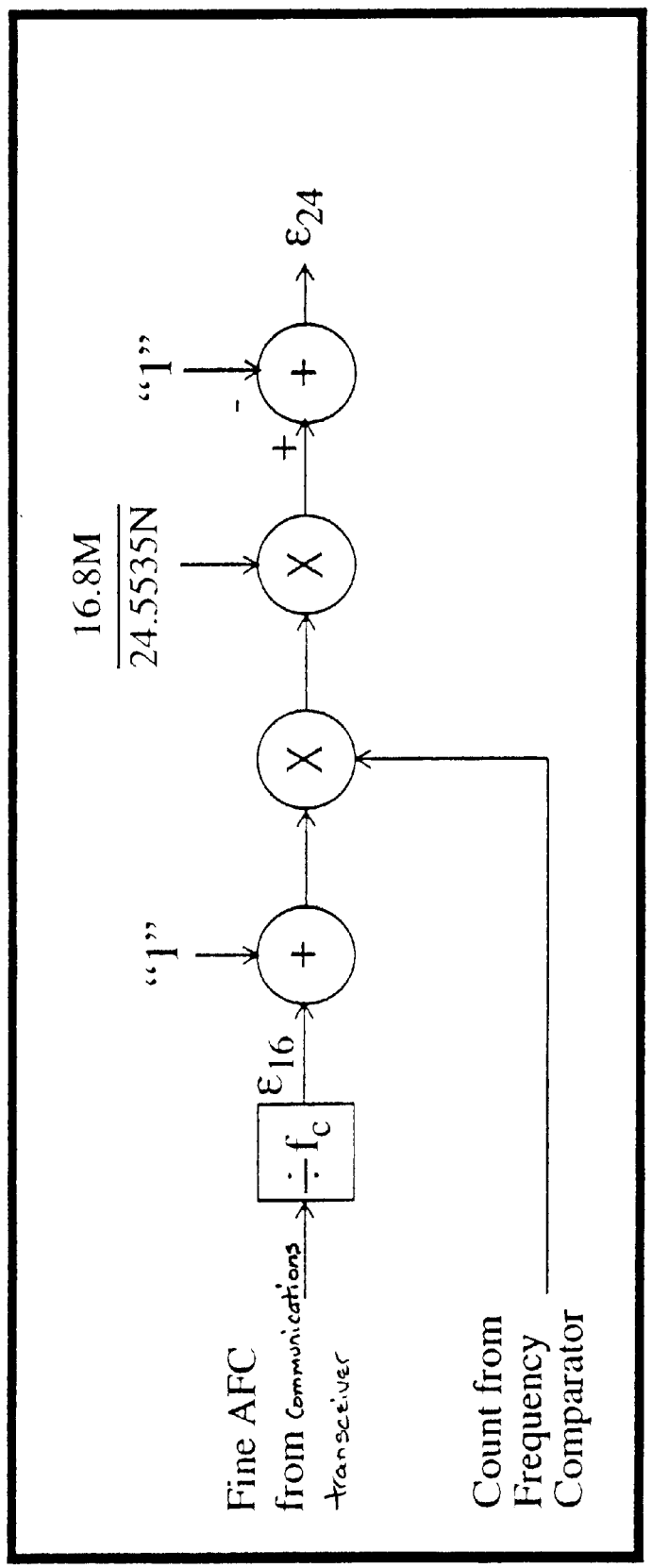
FIG. 3 illustrates frequency correction processing, according to an embodiment of the invention.

FIG. 3 is a block diagram illustrating processing steps of the frequency correction unit 80. As shown in that figure, the fine AFC data may be received from the communications transceiver 130, for instance via a universal asynchronous receiver/transmitter (UART) or other channel, and processed along with the output of the frequency comparator 60. After subtraction of the known contribution to total error by the cellular oscillator 30 according to Equation 1, the residual error $\varepsilon_{24\,may}$ be generated which represents the error caused by the GPS oscillator 70 to within the measurement limits of the fine AFC calculation, or other limiting factor in the comparisons performed.

The rate at which the frequency comparator 60 and frequency correction unit 80 may provide frequency aiding information to the GPS receiver 90 may be selected according to the drift rates of the cellular oscillator 30, GPS oscillator 70 or other factors. In implementations, during a cellular interconnect call AFC information may be updated at multiples of 45 ms. For example if a frequency aiding message is sent to the GPS receiver 90 every 45 ms and the maximum error reported is 0.2 ppm, then the effective tracking rate would be 4.4 ppm/second. Other rates are possible.

Thus far the techniques for analyzing error contributions and deriving frequency aiding information have in one regard been described. The following discussion describes techniques for transferring this information from the communications transceiver 130 portion of the hybrid communications/positioning device 10 to the GPS receiver 90 itself.

Figure 4:
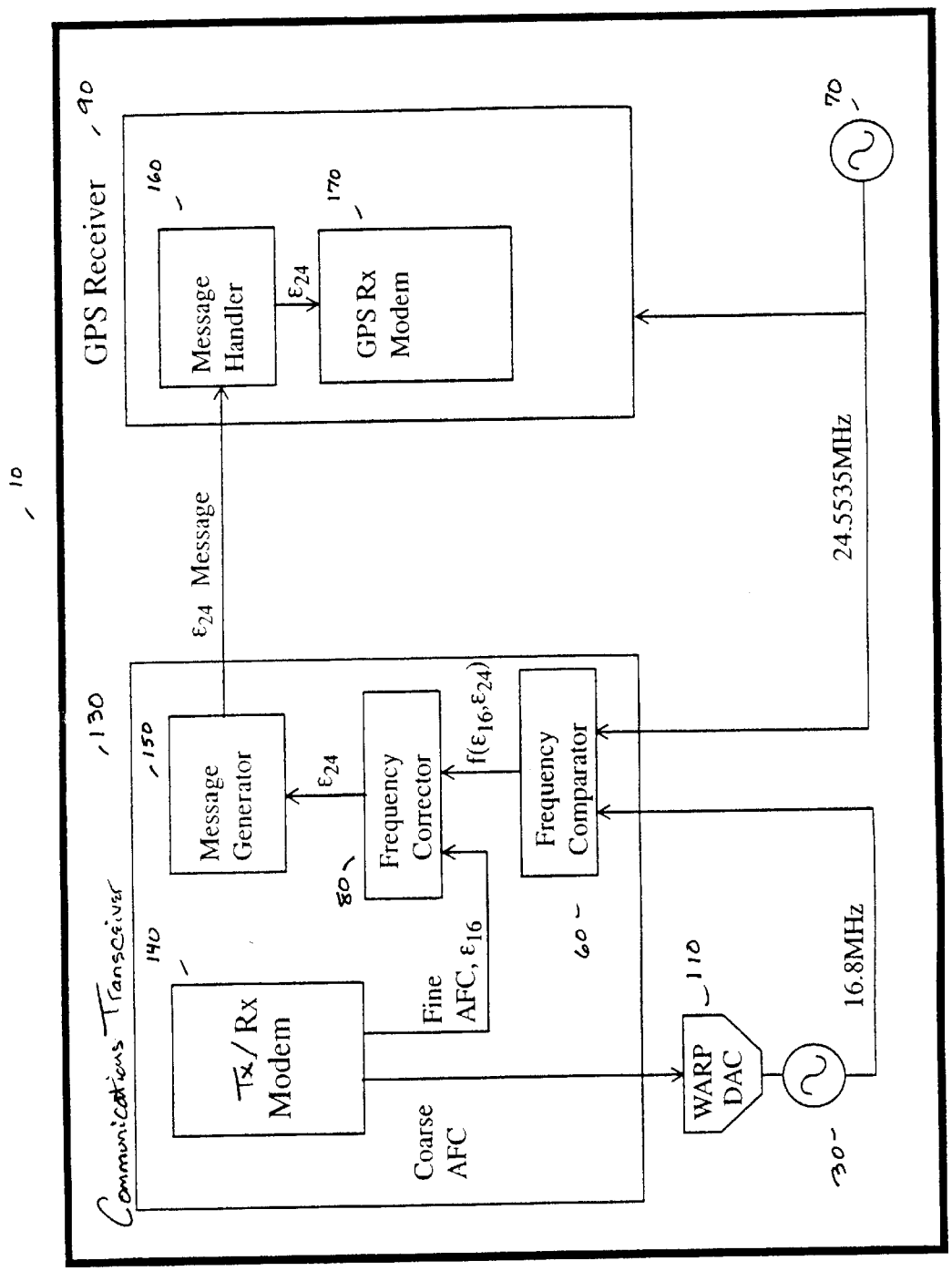
FIG. 4 illustrates an architecture for frequency management in a hybrid communications/positioning device, according to an embodiment of the invention.

FIG. 4 depicts an architectures for transferring frequency aiding information to the GPS receiver 90 according to an embodiment of the invention. In the arrangement shown in FIG. 4, derivation of the error in the GPS oscillator 70 (represented by $\varepsilon_{24}$) is performed wholly in the communications transceiver 130.

In the embodiment illustrated in FIG. 4, the frequency comparator 60 and frequency correction by the frequency corrector 80 operate in the communications transceiver 130. In this case, a message generator 150, which may be or include as a digital signal or other processor, may periodically send a completed message containing a computed $\varepsilon_{24}$ to the GPS receiver 90. The communications transceiver 130 also contains a transmit/receive modem 140 to carry out cellular or other communications functions, while the cellular oscillator 30 is likewise corrected by DAC warp 110 while a fine AFC is also sensed and communicated to the frequency corrector 80.

Frequency corrector 80 receives data representing the comparison of the cellular oscillator 30 and the GPS oscillator 70, and combined with the fine AFC values communicates the subsequent $\varepsilon_{24}$ value to message generator 150. Message generator 150 may in turn communicate that data to message handler 160 within GPS receiver 90, which transmits the data to a GPS receive modem 170. Transmit/receive modem 140 and GPS receive modem 170, as well as frequency corrector 80, message generator 160 and message handler 160 and other parts may each for instance be, include or interface to hardware, software or firmware implementations, for instance using digital signal or other processors such as the DSP 56000 family manufactured by Motorola Corp., executing communications or other software modules or routines.

The GPS receive modem 170 may adjust the Doppler search space, correlation bandwidth, and/or other control logic for GPS signal acquisition based on knowledge of the error in the GPS oscillator 70 which itself remains free-running. These adjustments enable improvements in TTFF, sensitivity, or other performance characteristics. In embodiments the GPS receive modem 170 may utilize the frequency error information to narrow the Doppler search space in order to improve TTFF. In embodiments the GPS receive modem 170 may utilize frequency error information to narrow correlation bandwidth in proportion to the Doppler search space, in order to improve receiver sensitivity. In embodiments the GPS receive modem 170 may utilize frequency error information to narrow both the Doppler search space and correlation bandwidth independently to achieve improvement in both TTFF and receiver sensitivity. Additionally the frequency error information may be used by the GPS receiver 90 to improve other performance characteristics. For instance, in embodiments the GPS receiver 90 may only be supplied with power, or with varying degrees of power, when GPS acquisition or tracking is activated to conserve batteries. In this case, achieving a faster TTFF may permit the amount of time that GPS receiver 90 is active to be reduced, thus extending battery life and service availability. In another regard, the use of an uncompensated or free-running GPS oscillator 70 may reduce the cost of manufacture of the hybrid communications/positioning device 10.

Figure 5:
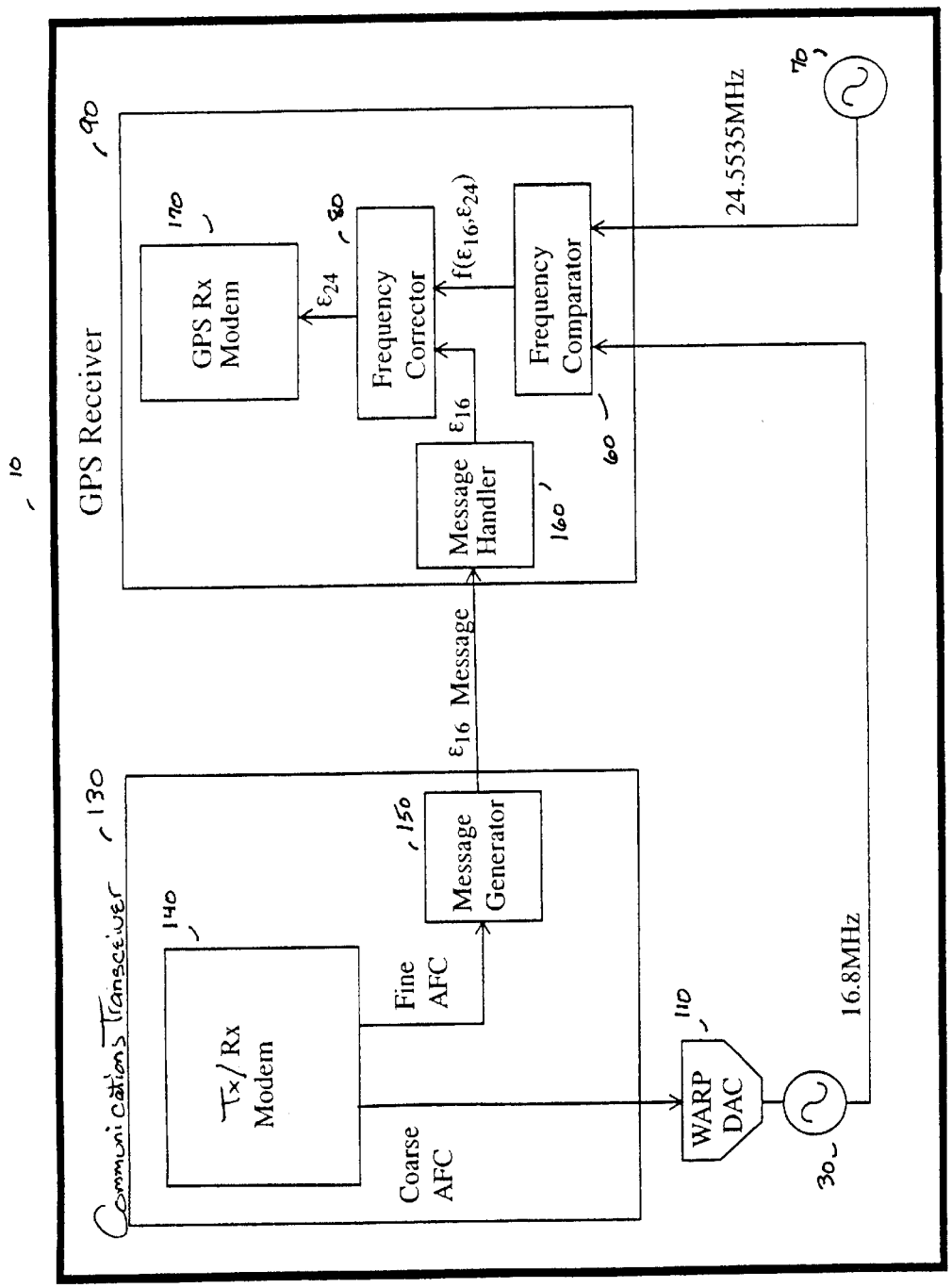
FIG. 5 illustrates an architecture for frequency management in a hybrid communications/positioning device, according to an embodiment of the invention.

In an embodiment illustrated in FIG. 5, derivation of the ultimate error value for the GPS oscillator 70 may be split between the communications transceiver 130 and the GPS receiver 90. In this embodiment, the GPS receiver 90 may use the fine AFC and the output of frequency comparator 80, illustratively located within GPS receiver 90, to complete processing such as that depicted in FIG. 3 to generate the residual error in the GPS oscillator 70, $\in_{24}$. In this case, the message generator 150 formats and transmits not a completed value for the error in the GPS oscillator, $\in_{24}$, but instead a message indicating the amount of residual error in the cellular oscillator 30 after coarse AFC correction by the DAC warp 110. That residual error is reflected in the fine AFC correction value, $\in_{16}$.

The GPS receiver 90 may then receive the AFC correction value, which may for instance be expressed in steps of 0.05 ppm or other values, via the message handler 160. Message handler 160 may then communicate that data to the frequency corrector 80, which also receives the results of comparison by frequency comparator 60 between the cellular oscillator 30 and the GPS oscillator 70. Frequency corrector 80 therefore accepts an indication of the offset error between the cellular oscillator 30 and the GPS oscillator 70, as well as the fine AFC ($\in_{16}$) which permits frequency corrector 80 to remove that portion of the error contributed by the cellular oscillator 30, to within the precision of the fine AFC algorithm. The residual error may be assumed to be due to the bias in the GPS oscillator 70, and is communicated as such ($\in_{24}$) to the GPS receive modem 170 to adjust the Doppler search or other control logic to increase positioning and other receiver performance.

In the embodiments illustrated in both FIG. 4 and FIG. 5, a message is thus periodically sent from the communications transceiver 130 to the GPS receiver 90 to effectuate error detection and downstream compensation to account for bias in the GPS oscillator 70. FIG. 6 illustrates a set of timing traces (A–E) for preparation and delivery of frequency aiding messages, in each case. The top trace, trace A in that figure represents the activity on the cellular communications channel, for instance in the 800/900 Mhz or 1.9 GHz or other bands. Trace B depicts the instantaneous frequency of the cellular oscillator 30, generally showing a gradual upward drift in the 16.8 MHz clock of the cellular oscillator 30 until about midtrace.

At the midtrace point in trace B, there is a sharp downward change in reference frequency as the effect of the DAC warp 110 is applied to the cellular oscillator 30. Trace C illustrates messaging between the communications transceiver 130 and GPS receiver 90 according to the embodiment illustrated in FIG. 5, while trace D illustrates messaging between the communications transceiver 130 and GPS receiver 90 according to the embodiment illustrated in FIG. 4, respectively. The bottom trace, trace E annotates relevant timing events. The illustrated scenario shows a 3:1 interconnect frame with an overall period of 45 millisec.

During the serving receive slot (shown as Rx) the communications transceiver 130 may measure the frequency offset of the cellular oscillator 30. In embodiments, a snapshot of the frequency offset of the cellular oscillator 30 may be taken multiple times during the receive slot Rx, and for instance averaged or otherwise processed to arrive at a synthetic value. The fine AFC data may be updated just after the receive slot Rx, as shown in trace C during Frame 1. In the illustrated event, a DAC warp correction is appropriate because the accumulated drift in the cellular oscillator 30 exceeds step resolution of the DAC warp 110. As shown in trace B, at midtrace after the coarse AFC of the DAC warp 110 is applied just before the receive slot Rx in Frame 2, the instantaneous frequency corrects to a lower value. If the cellular oscillator 30 is operating at 16.8 MHz, the value of coarse AFC correction may be, for instance, in the range of 200 Hz. Other values are possible.

The message sent to the GPS receiver 90 contains the fine AFC measurement in the embodiment illustrated in FIG. 4, or the actual error in the GPS oscillator 70 in the embodiment of FIG. 5. In either case the frequency measurement in Frame 1 is based on the error in the cellular oscillator 30 before the ensuing DAC warp update. After the next receive slot Rx in Frame 2, the fine AFC may again be updated but before a new DAC warp update is evaluated. In this case the change in the value of the fine AFC adjustment may be comparatively large, because the measurement is based on the frequency of the cellular oscillator 30 after the effect of the DAC warp update. The error message $(\in_{16})_{k+1}$ shown in trace C which is sent to the GPS receiver 90 according to the embodiment of FIG. 5 may therefore reflect a comparatively sharp change or step increment in Frame 2. The error message $(\in_{24})_{k+1}$ shown in trace D according to the embodiment of FIG. 4 in contrast may demonstrate a comparatively lesser change in value in Frame 2, since the value of $(\in_{24})_{k+1}$ has already removed the effect of changes in the fine AFC leaving only the bias in the GPS oscillator 70 itself, which is not affected by the AFC operations on cellular oscillator 30.

In terms of performance advantage, in implementations according to the invention, the requirement for high tolerance parts such as high-precision TCXOs or other components for use in GPS oscillator 70 is significantly relaxed. Use of the invention consequently makes it possible to use oscillator parts with comparatively high frequency deviation, for example ±2.5 ppm or more, while maintaining equivalent performance to that of a highly accurate TCXO or other reference. The performance of ±3 ppm oscillator parts is typically as follows:

TABLE 1

| Single Frequency Transfer (3 ppm, 100 us, 30 km) | | | | |
|---|---|---|---|---|
| | TTFF (DOP < 50) | | Hor. Error (DOP < 2) | |
| Parameters | 50% | 95% | 50% | 95% |
| C/No (dBHz) >= 37 | 2.0 | 2.5 | 2.3 | 5.5 |
| 36 >= C/No (dBHz) >= 33 | 3.0 | 4.8 | 5.0 | 12.5 |
| 32 >= C/No (dBHz) >= 23 | 73.3 | 120.0 | 5.1 | 16.0 |

All TTFF numbers are in seconds
All Horizontal Error numbers are in meters

All TTFF numbers are in seconds

All Horizontal Error numbers are in meters

With the benefit of the error tracking, frequency aiding and other aspects of the invention, the resulting GPS receiver performance may be at least equivalent to that of a hardware ±0.5 ppm TCXO or other part, as shown below:

TABLE 2

Single Frequency Transfer (.5 ppm, 100 us, 30 km)

| Parameters | TTFF (DOP < 50) | | Hor. Error (DOP < 2) | |
|---|---|---|---|---|
| | 50% | 95% | 50% | 95% |
| C/No (dBHz) >= 37 | 2.1 | 2.4 | 2.8 | 6.5 |
| 36 >= C/No (dBHz) >= 33 | 3.5 | 4.6 | 5.0 | 12.5 |
| 32 >= C/No (dBHz) >= 23 | 23.0 | 29.9 | 4.8 | 15.2 |

All TTFF numbers are in seconds
All Horizontal Error numbers are in meters

All TTFF numbers are in seconds
All Horizontal Error numbers are in meters

The inventors have empirically confirmed that the invention may compensate or correct for errors of at least ±8 ppm in the GPS oscillator 70, while still maintaining TTFF and other receiver performance equivalent to that of ±0.5 ppm hardware TCXOs or other parts. Compensation for significantly higher values of offset in the GPS oscillator 70 is possible.

The foregoing description of the invention is illustrative, and modifications in configuration and implementation will occur to persons skilled in the art. For instance, while the invention has generally been described in terms of a hybrid cellular/GPS device, in embodiments other devices, such as two-way pagers, wireless network-enabled computers or other clients or devices may be configured with GPS capability according to the invention.

Similarly, while the invention has generally been described in terms of oscillator parts which drive communications and positioning circuitry within a combined device, in embodiments one or more of oscillators, synthesizers, phase locked loops and other circuitry or software may be combined to deliver clock reference signals to those and other circuits of the platform. The scope of the invention is accordingly intended to be limited only by the following claims.

We claim:

1. A system for generating corrective information based on a frequency reference in a hybrid communications device, comprising:
    a first clock source in a communications portion of the communications device, the first clock source generating a first clock signal at a first frequency;
    a first clock correction module, communicating with the first clock source, the first clock correction module sensing a first error in the first frequency;
    a second clock source in a positioning portion of the communications device, the second clock source generating a second clock signal at a second frequency;
    a comparator module, communicating with the first clock source and the second clock source, the comparator module comparing the first frequency and the second frequency to determine a differential error between the first frequency and the second frequency; and
    a processor, communicating with the comparator module, the processor adapting a position processing operation based upon at least the first error and the differential error.

2. A system according to claim 1, wherein the communications portion comprises at least one of a cellular telephone, a two-way pager and a network-enabled wireless communication device.

3. A system according to claim 1, wherein the positioning portion comprises a satellite positioning receiver.

4. A system according to claim 3, wherein the satellite positioning receiver comprises a global positioning system receiver.

5. A system according to claim 1, wherein the first clock source comprises a first oscillator.

6. A system according to claim 5, wherein the first clock source comprises a first synthesizer.

7. A system according to claim 6, wherein the first clock source comprises a first phase locked loop.

8. A system according to claim 1, wherein the second clock source comprises a second oscillator.

9. A system according to claim 8, wherein the second clock source comprises a second synthesizer.

10. A system according to claim 9, wherein the second clock source comprises a second phase locked loop.

11. A system according to claim 1, wherein the first clock correction module comprises an automatic frequency control module.

12. A system according to claim 11, wherein the automatic frequency control module comprises an automatic frequency control circuit.

13. A system according to claim 11, wherein the automatic frequency control module comprises an automatic frequency control algorithm.

14. A system according to claim 11, wherein the automatic frequency control module comprises at least a coarse automatic frequency control module.

15. A system according to claim 14, wherein the automatic frequency control module comprises a fine automatic frequency control module.

16. A system according to claim 1, wherein the comparator module comprises a gated counter.

17. A system according to claim 1, wherein the positioning receiver portion comprises a global positioning system receiver.

18. A system according to claim 1, wherein the adapted position processing comprises an adjustment to a Doppler search window used to acquire a positioning signal.

19. A system according to claim 1, wherein the adapted position processing comprises an adjustment to correlator bandwidth used to acquire a positioning signal.

20. A system according to claim 1, wherein the processor determines a second clock error based upon at least the first error and the differential error.

21. A method for generating corrective information based on a frequency reference in a hybrid communications device, comprising:
    generating a first clock signal at a first frequency in a communications portion of the communications device;
    sensing a first error in the first frequency;
    generating a second clock signal at a second frequency in a positioning portion of the communications device;
    comparing the first frequency and the second frequency to determine a differential error between the first frequency and the second frequency; and
    adapting a position processing operation based upon at least the first error and the differential error.

22. A method according to claim 21, wherein the communications portion comprises at least one of a cellular telephone, a two-way pager and a network-enabled wireless communication device.

23. A method according to claim 21, wherein the positioning portion comprises a satellite positioning receiver.

24. A method according to claim 23, wherein the satellite positioning receiver comprises a global positioning system receiver.

25. A method according to claim 21, wherein the generating a first clock signal comprises operating a first oscillator.

26. A method according to claim 25, wherein the generating a first clock signal comprises operating a first synthesizer.

27. A method according to claim 26, wherein the generating a first clock signal comprises operating a first phase locked loop.

28. A method according to claim 21, wherein the generating a second clock signal comprises operating a second oscillator.

29. A method according to claim 28, wherein the generating a second clock signal comprises operating a second synthesizer.

30. A method according to claim 29, wherein the generating a second clock signal comprises operating a second phase locked loop.

31. A method according to claim 21, wherein the sensing a first error comprises performing an automatic frequency control operation.

32. A method according to claim 31, wherein the performing an automatic frequency control operation comprises operating an automatic frequency control circuit.

33. A method according to claim 31, wherein the performing an automatic frequency control operation comprises executing an automatic frequency control algorithm.

34. A method according to claim 31, wherein the performing an automatic frequency control operation comprises operating at least a coarse automatic frequency control module.

35. A method according to claim 34, wherein the performing an automatic frequency control operation comprises operating a fine automatic frequency control module.

36. A method according to claim 21, wherein the comparing comprises operating a gated counter.

37. A method according to claim 21, wherein the positioning receiver portion comprises a global positioning system receiver.

38. A method according to claim 21, wherein the adapting comprises adjusting a Doppler search window used to acquire a positioning signal.

39. A method according to claim 21, wherein the adapting comprises adjusting a correlator bandwidth used to acquire a positioning signal.

40. A method according to claim 21, further comprising determining a second clock error based upon at least the first error and the differential error.

41. A system for generating corrective information based on a frequency reference in a hybrid communications device, comprising:

first clock means in a communications portion of the communications device, the first clock means generating a first clock signal at a first frequency;

first clock correction means, communicating with the first clock source, the first clock correction means sensing a first error in the first frequency;

second clock means in a positioning portion of the communications device, the second clock means generating a second clock signal at a second frequency;

comparator means, communicating with the first clock means and the second clock means, the comparator means comparing the first frequency and the second frequency to determine a differential error between the first frequency and the second frequency; and processing means, communicating with the comparator means, the processor means adapting a position processing operation based upon at least the first error and the differential error.

42. A system according to claim 41, wherein the communications portion comprises at least one of a cellular telephone, a two-way pager and a network-enabled wireless communication device.

43. A system according to claim 41, wherein the positioning portion comprises a satellite positioning receiver.

44. A system according to claim 43, wherein the satellite positioning receiver comprises a global positioning system receiver.

45. A system according to claim 41, wherein the first clock means comprises first oscillator means.

46. A system according to claim 45, wherein the first clock means comprises first synthesizer means.

47. A system according to claim 46, wherein the first clock means comprises first phase locked loop means.

48. A system according to claim 41, wherein the second clock means comprises second oscillator means.

49. A system according to claim 48, wherein the second clock means comprises second synthesizer means.

50. A system according to claim 49, wherein the second clock means comprises second phase locked loop means.

51. A system according to claim 41, wherein the first clock correction means comprises automatic frequency control means.

52. A system according to claim 51, wherein the automatic frequency control means comprises an automatic frequency control circuit.

53. A system according to claim 51, wherein the automatic frequency control means comprises an automatic frequency control algorithm.

54. A system according to claim 51, wherein the automatic frequency control means comprises at least a coarse automatic frequency control means.

55. A system according to claim 54, wherein the automatic frequency control means comprises a fine automatic frequency control means.

56. A system according to claim 41, wherein the comparator means comprises gated counter means.

57. A system according to claim 41, wherein the positioning receiver portion comprises global positioning system receiver means.

58. A system according to claim 41, wherein the adapted position processing comprises an adjustment to a Doppler search window used to acquire a positioning signal.

59. A system according to claim 41, wherein the adapted position processing comprises an adjustment to correlator bandwidth used to acquire a positioning signal.

60. A system according to claim 41, wherein the processor means determines a second clock error based upon at least the first error and the differential error.

* * * * *